Aug. 9, 1927.

E. MEHLINE 1,638,357

TRACTOR BRAKE

Filed Oct. 20, 1924   5 Sheets-Sheet 1

Inventor
Emile Mehline

Aug. 9, 1927. 1,638,357
E. MEHLINE
TRACTOR BRAKE
Filed Oct. 20, 1924 5 Sheets-Sheet 2

Inventor
Emile Mehline
By Hazard and Miller
Attorneys.

Witness:
W. H. Hall

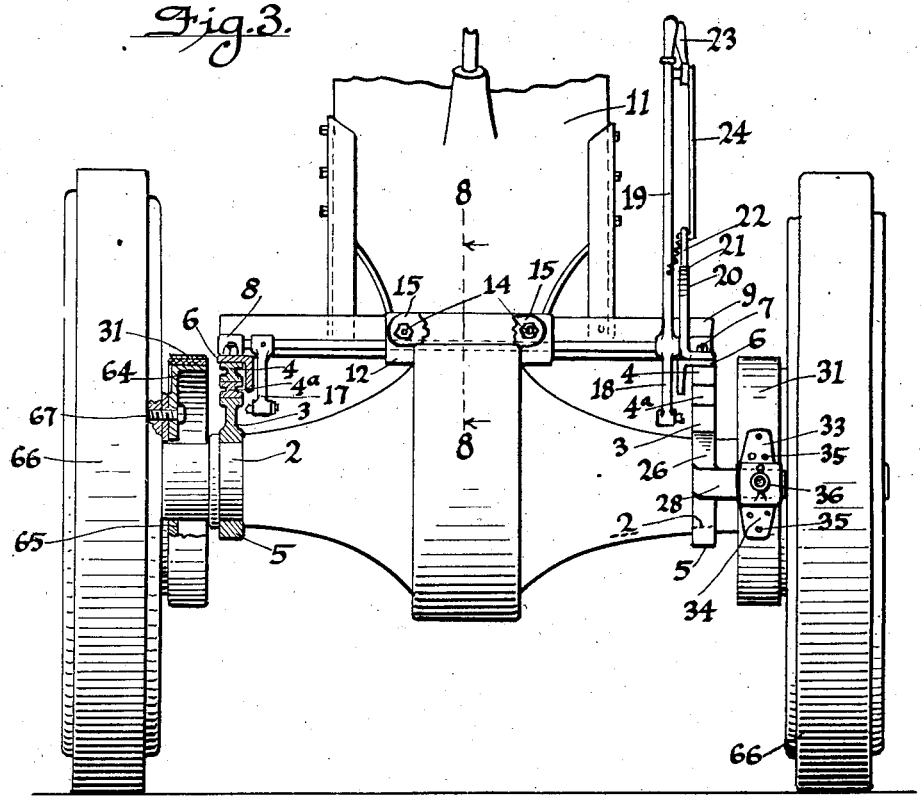

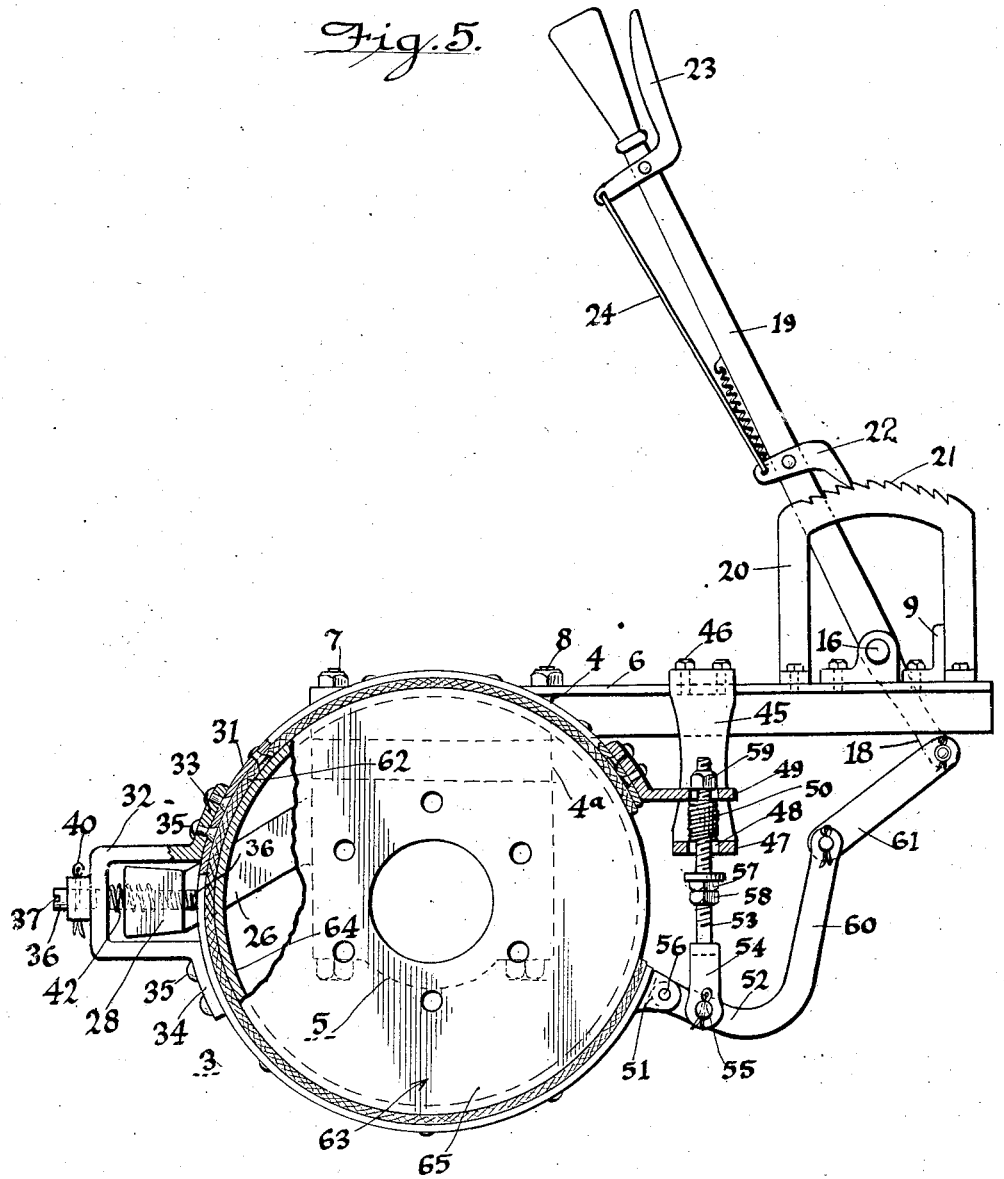

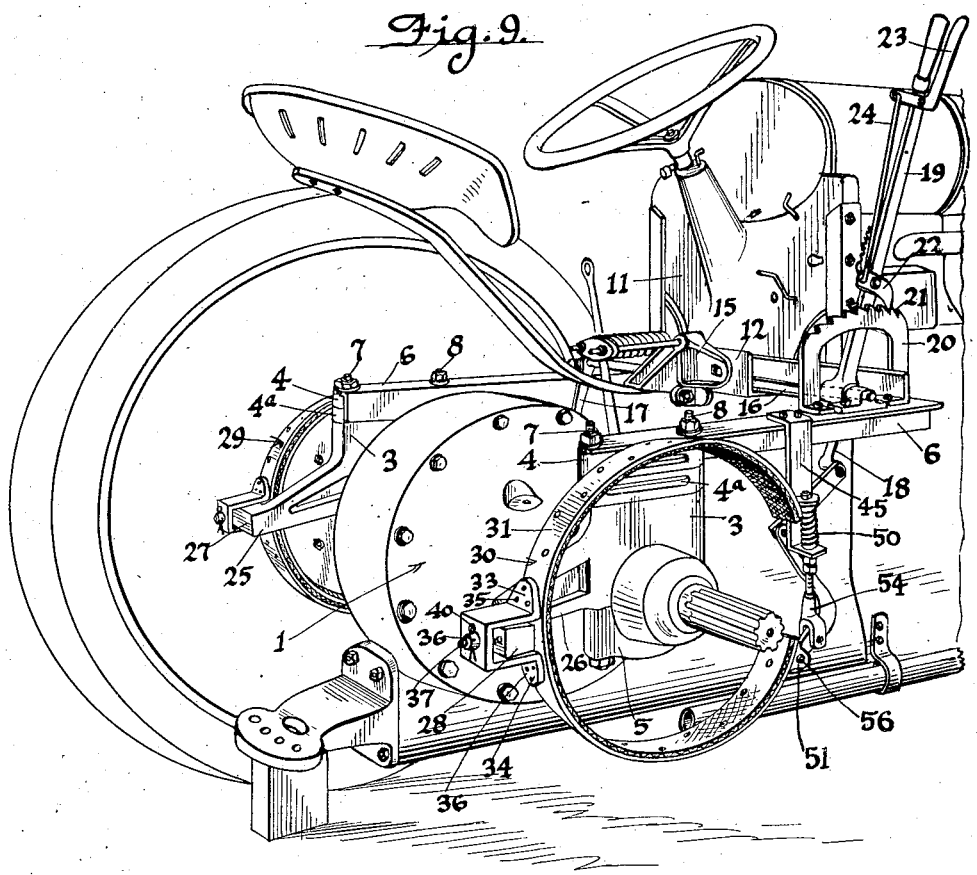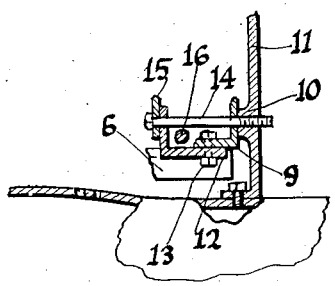

Patented Aug. 9, 1927.

1,638,357

UNITED STATES PATENT OFFICE.

EMILE MEHLINE, OF HOLLYWOOD, CALIFORNIA, ASSIGNOR TO EVANS BRAKE & SUPPLY CO., OF LOS ANGELES, CALIFORNIA, A CORPORATION OF CALIFORNIA.

TRACTOR BRAKE.

Application filed October 20, 1924. Serial No. 744,760.

This invention is a tractor brake and consists of the novel features herein shown, described and claimed.

An object is to make a brake construction adapted to be applied to a tractor for the purpose of providing additional braking power for the tractor.

Other objects and advantages will appear from the drawings and specification.

The drawings illustrate the construction and operation of a brake embodying the principles of my invention and applied to a Fordson tractor.

Fig. 3 is a rear elevation as indicated by the arrow 3 in Fig. 1.

Fig. 4 is a vertical cross section on the line 4—4 of Fig. 1.

Fig. 5 is an enlarged detailed elevation on the same plane as Fig. 1 with parts of the tractor omitted and showing the brake set, whereas in Fig. 1 the brake is released.

Fig. 8 is a fragmentary sectional detail on the lines 8—8 of Figs. 2 and 3.

Fig. 9 is a perspective looking in the direction indicated by the arrow 9 in Fig. 1 with one wheel removed and showing the two brakes as assembled upon the tractor to be operated from a single hand lever.

Figure 1:
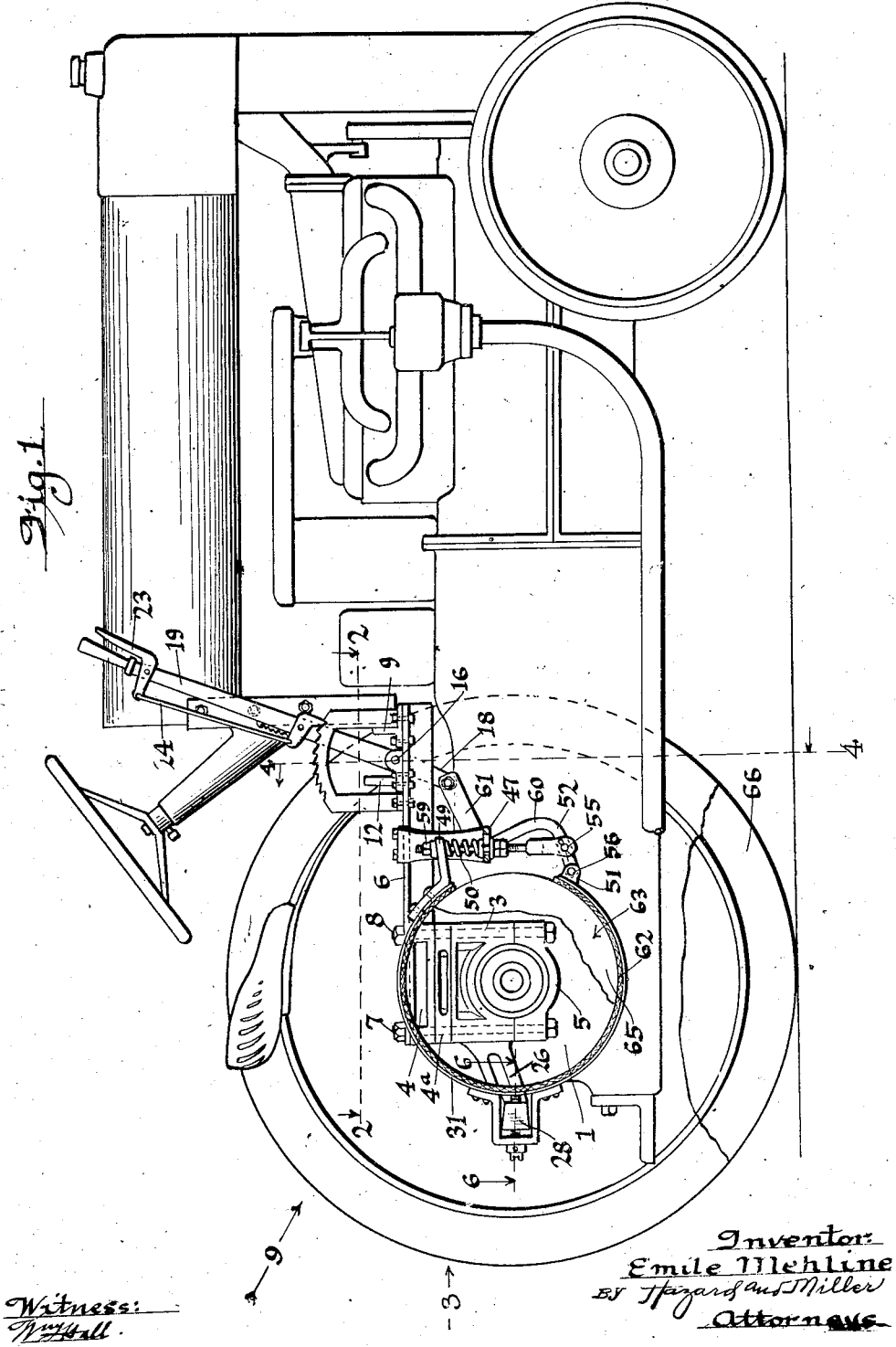
Figure 1 is a side elevation of a tractor, one driving wheel being removed to show the brake construction, the view being taken looking in the direction indicated by the arrow 1 in Fig. 2.
Figure 2:
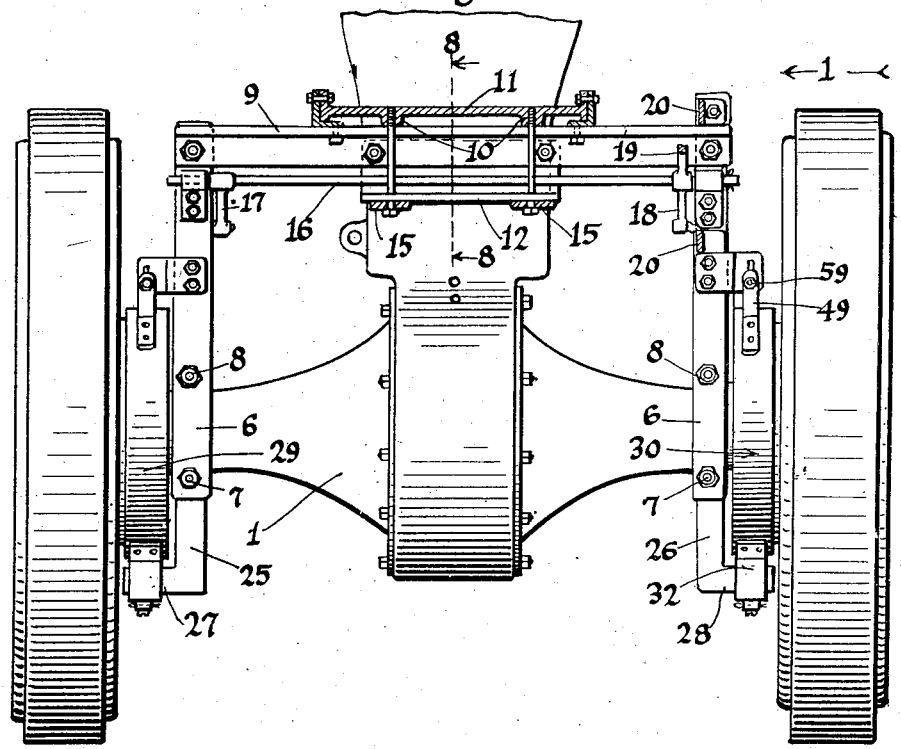
Fig. 2 is a fragmentary horizontal section on the line 2—2 of Fig. 1 and looking downwardly as indicated by the arrows.
Figure 6:
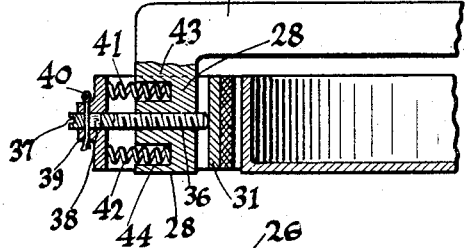
Fig. 6 is a sectional detail on the line 6—6 of Fig. 1 and showing the brake released.
Figure 7:
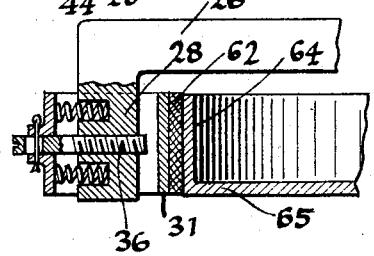
Fig. 7 is a view analogous to Fig. 6 and showing the brake set.

The details of construction and operation shown in the drawings are as follows:

The rear axle housing 1 of the tractor has annular seats 2 a short distance inside of the wheel hub. The main brake band supporting blocks 3 are mounted in the upper parts of the seats 2. Extension blocks 4ª and 4 are mounted upon the blocks 3. Clamping blocks 5 are mounted in the lower parts of the seats. Extension bars 6 are mounted upon the extension blocks 4 and bolts 7 and 8 are inserted upwardly through the clamping blocks 5 past the axle housing and through the main blocks 3, through the extension blocks 4 and through the extension bars 6, and nuts are applied to upper ends of the bolts to clamp the parts securely together. The extension bars 6 extend forwardly a considerable distance and in substantially horizontal planes. A cross bar 9 in the form of an angle iron connects the forward ends of the bars 6 and fits against the lugs 10 extending backwardly from the vertical frame 11. The bolts usually connecting the lower end of the spring construction to the frame 10 are previously removed. A short angle iron 12 is placed in position with its horizontal flange under the horizontal flange of the cross bar 9 and bolts 13 connect the overlapping flanges together.

Long bolts 14 are substituted for the bolts previously removed and are inserted through the seat portion 15 through the upstanding flanges of the angle irons 9 and 12 and tapped into the lugs 10, thereby connecting the supporting mechanisms of the two brake constructions together and holding the blocks from turning upon the axle housing 1.

A brake operating rock shaft 16 is mounted in bearings upon the bars 6 just behind the bar 9. Crank arms 17 and 18 extend downwardly from the rock shaft and an operating hand lever 19 extends upwardly from the crank arm 18. A pawl rack 20 is mounted upon the bar 6 at the right hand side and extends upwardly and has a segmental row of pawl teeth 21. A pawl 22 is carried by the hand lever 19 to engage the teeth 21. A pawl operating handle 23 is pivotally connected near the upper end of the hand lever 19 and a link 24 connects the handle 23 to the pawl 22. The arms 17 and 18 are rigid with the shaft 16 and in parallel positions and the hand lever 19 is rigid with the crank arm 18 so that a hand lever operates the crank arms 17 and 18 simultaneously. Supporting arms 25 and 26 extend backwardly from the main blocks 3 and horns 27 and 28 extend outwardly from the rear ends of the supporting arms 25 and 26.

Brake band constructions 29 and 30 have their rear portions mounted upon the horns 27 and 28, said brake band constructions being substantially alike, and the details of the brake band construction 30 are as follows:

A brake band 31 forms nearly a circle in side elevation. A U-shaped box 32 has attaching flanges 33 and 34 secured to the band 31 by rivets 35, the box being located substantially at the center of the length of the band. The box 32 fits loosely upon the horn 28. A screw 36 is inserted through the horn 28 to engage the center of the band 31 and the screw extends loosely through a central opening in the box 32 and has a kerf 37 in its outer end for adjusting the screw and a longitudinally elongated opening 38 near its outer end. A hub 39 extends from the box around the opening and a cotter pin 40 is inserted through the hub 39 and through the opening 38 so as to allow the box a limited amount of movement longitudinally and to the extent of the slot 38. Expansive coil springs 41 and 42 are inserted between the central member of the box 32 and the horn 28 and extend into openings 43 and 44 bored from the rear face of the horn 28 to form seats and hold the springs 41 and 42.

A hanger 45 has an inturned upper end fitting upon the bars 6 and secured in place by bolts 46, and the hanger extends downwardly a considerable distance and has an outturned lower end forming a ledge 47 having a vertical opening 48. An operating plate 49 is secured to the upper end of the band 31 and extends horizontally outside of the hanger 45 and some distance above the ledge 47. An expansive coil spring 50 is inserted between the plate 49 and the ledge 47. A bearing 51 is secured to the lower end of the band 31. A lever arm 52 is pivotally connected to the bearing 51. A bolt 53 has a bifurcated head 54 straddling the lever arm 52 and secured to the lever arm by a pivot 55 a short distance from the pivot 56 connecting the lever arm 52 to the bearing 51. A stop 57 is adjustably mounted upon the bolt 53 and held in adjusted position by a jam nut 58, the stop being adapted to engage the lower face of the ledge 47. The bolt 53 extends loosely through the opening 48 and loosely through the spring 50 and through the plate 49 and has a washer and nut 59 adjustably mounted upon its upper end against the plate 49. A lever arm 60 is formed integral with the lever arm 52 and extends upwardly a considerable distance and at substantially right angles to the lever arm 52. A link 61 connects the upper end of the lever arm 60 to the lower end of the crank arm 18 so that when the hand lever 19 and the pawl are properly operated to move the hand lever forwardly as in Figs. 1 and 9, the brake band is released and so that when the hand lever is moved backwardly as in Fig. 5, the brake band is set.

A brake lining 62 is mounted inside of the brake band 31 to engage a brake wheel 63. The brake wheel 63 consists of a rim 64 and a disc-shaped web 65 fitting around the outer end of the axle housing 1 and the web 65 is secured to the traction drive wheel 66 by cap screws 67 so that when the brake band 31 is set the lining 62 will grip the rim 64 and brake the traction wheel 66.

The details of the brake band construction 29 with its brake wheel and connections, including the crank arm 17, are the same as the details above described with reference to the brake band construction 30.

In the practical operation, the brake band 31 is held away from the brake wheel when the hand lever 19 is moved forwardly and this is due to the expansion of the spring 50 and the expansion of the springs 41 and 42. The adjustment of the brake band may be accurately made by manipulating the screw 36. When the hand lever 19 starts to move backwardly the lever arm 52 operates the lower part of the brake band to bring the lining 62 into engagement with the brake wheel, and continued backward movement of the hand lever 19 pulls downwardly upon the bolt 53 thereby pulling downwardly upon the plate 49 against the tension of the spring 50 and tightening the upper part of the brake. The stop 57 serves to centralize the bolt 53 and limit the action of the spring 50 when the brake is released. The entire construction is intended to be strong and to give additional braking power to the tractor to which it is applied.

The brake is applied without boring any holes or making any other changes whatever in the tractor as built, and when applied the brake does not interfere with the attachment of any desired implement to the tractor.

The object of making three blocks, 3, 4ᵃ and 4, for mounting the brake structure upon the axle housing is to provide means for attaching various implements to the axle housing, and this may be accomplished by omitting the intermediate block 4ᵃ and substituting the attachment.

Various changes may be made without departing from the spirit of the invention as claimed.

I claim:

1. A tractor brake comprising blocks adapted to encircle and be clamped upon a rear axle housing having upper blocks connected to one of said blocks, extension arms extending forwardly from the tops of the upper blocks, means for rigidly connecting the arms to the tractor frame, brake band supporting arms extending backwardly from one of the blocks, horns extending outwardly from the rear ends of these arms, brake band supporting boxes loosely, adjustably and yieldingly mounted upon the horns, brake bands secured to the boxes, and means mounted upon the extension arms for operating the brake bands.

2. A tractor brake comprising blocks adapted to encircle and be clamped upon a rear axle housing having upper blocks connected to one of said blocks, extension arms extending forwardly from the tops of the upper blocks, means for rigidly connecting the arms to the tractor frame, brake band supporting arms extending backwardly from one of the blocks, horns extending outwardly from the rear ends of these arms, brake band supporting boxes loosely, adjustably and yieldingly mounted upon the horns, brake bands secured to the boxes, brake wheels adapted to be fixed to the traction driving wheels in positions to be engaged by the brake bands, and means mounted upon the extension arms for operating the brake bands.

3. A tractor brake comprising in combination a tractor having a rear axle housing with circular portions adjacent each wheel and having brake drums on the wheel, an attachment having a pair of blocks encircling and clamping the circular portions of the housing having upper blocks connected to one of said blocks, extension bars bolted to the upper blocks and extending forwardly from the said blocks, a cross bar rigidly attached to the forward ends of said extension bars, means to connect the cross bar to a portion of the frame of the tractor, horns extending rearwardly from the blocks, brake bands adjustably supported on the horns, a rock shaft mounted on the extension bars, a brake lever to operate said rock shaft and an operative connection from the rock shaft to the forward ends of the brake bands, adapted to set and unset the brake bands.

4. A tractor brake comprising in combination a tractor having a rear axle housing with a circular portion adjacent each wheel, a brake drum attached to each wheel, a pair of block assemblies, means rigidly clamping each block assembly to each of the circular portions, an extension bar rigidly bolted to the top of each of the block assemblies and extending forwardly, a cross bar connecting the extension bars, means to secure said cross bar to part of the tractor frame, a horn extending rearwardly from each block assembly, a brake band loosely mounted on each horn at substantially its middle portion, a hanger depending from each extension bar having a horizontal ledge with an opening therethrough, a plate secured to the upper end of the brake band, a lever arm swivelly connected to the lower end of the brake band, an adjustable link connecting the said lever arm and said plate passing through the opening in the said ledge, a spring surrounding the link, positioned between the ledge and the plate and a hand brake lever operatively mounted on the extension bars and operative means between the brake lever and the lever arm.

5. A tractor brake as claimed in claim 3, in which the means to connect the cross bar to the tractor frame comprises an angle-shaped cross bar, a short angle iron attached thereto, a seat portion of the tractor on the angle iron and a bolt extending through the said portion, the angle iron and the cross bar, said bolt being secured into part of the tractor frame.

In testimony whereof I have signed my name to this specification.

EMILE MEHLINE.